UNITED STATES PATENT OFFICE.

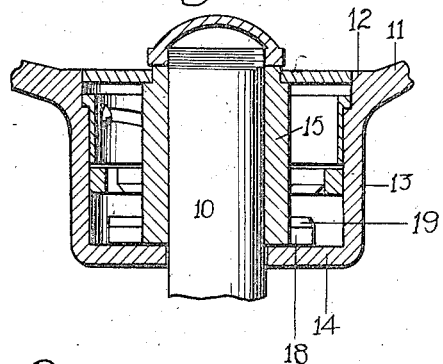
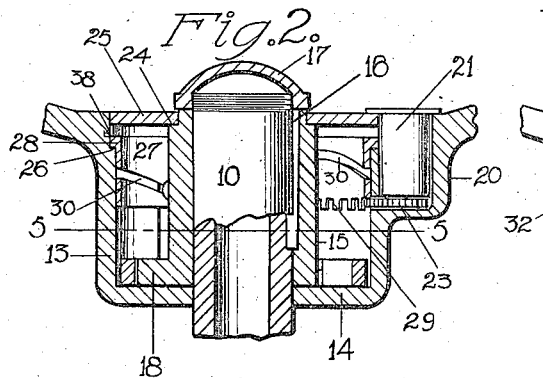
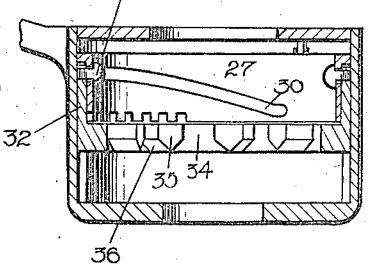
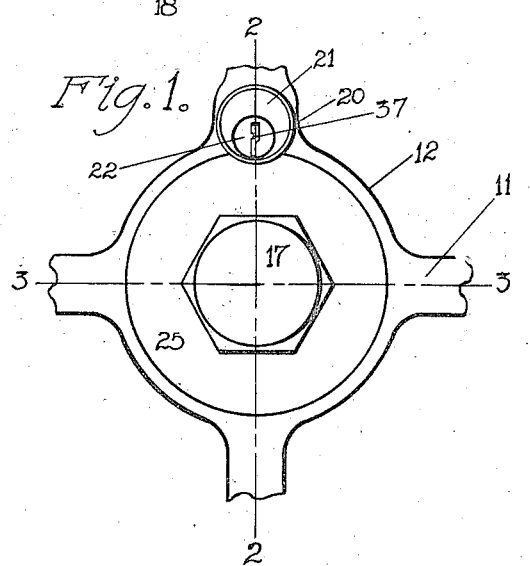
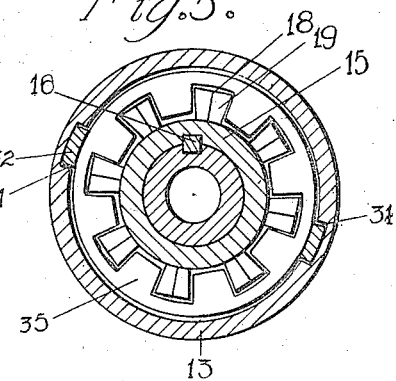

CLAUDE E. MENTZER, OF DES MOINES, IOWA, ASSIGNOR OF ONE-THIRD TO CARL B. SMITH AND ONE-THIRD TO SAMUEL G. MATTHEIS, OF DES MOINES, IOWA.

STEERING-WHEEL LOCK FOR AUTOMOBILES.

1,227,644. Specification of Letters Patent. Patented May 29, 1917.

Application filed April 5, 1917. Serial No. 160,004.

*To all whom it may concern:*

Be it known that I, CLAUDE E. MENTZER, a citizen of the United States, and resident of Des Moines, in the county of Polk and State of Iowa, have invented a certain new and useful Steering-Wheel Lock for Automobiles, of which the following is a specification.

The object of my invention is to provide a steering wheel lock for automobiles of simple, durable and inexpensive construction.

A further object is to provide such a device having parts so constructed and arranged that the movable steering wheel and the fixed post may be locked together at a large number of points for preventing interference with the lock.

A further object is to provide in such a lock new and novel means for controlling the movable locking member.

With these and other objects in view my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of a portion of a steering wheel equipped with a lock embodying my invention.

Fig. 2 shows a vertical, sectional view through the hub of the steering wheel, showing parts of my improved lock, taken on the line 2—2 of Fig. 1.

Fig. 3 shows a similar view showing additional parts.

Fig. 4 shows a vertical, sectional view through the hub of the wheel, and part of the lock, the steering post being omitted, and Fig. 5 shows a horizontal, sectional view taken on the line 5—5 of Fig. 2.

In the accompanying drawings, I have used the reference numeral 10 to indicate generally the steering post of a motor vehicle, on which is mounted the steering wheel having the spokes 11, and the hub 12. The hub 12 has an annular, downwardly extending flange 13 forming a part of the lock casing, and at the lower end of the flange 13 is a flange 14 extending inwardly to the steering post 10.

Fixed on the upper end of the post 10 is a sleeve 15 held in position by means of a wedge-shaped spline 16.

Formed at the lower edge of the sleeve 15 is a plurality of outwardly extending teeth or lugs 18, the upper edges of which are beveled, as shown at 19, in Fig. 3.

The casing formed by the flange 13 has an off-set portion 20, shown in Figs. 1 and 2, designed to receive the cylinder 21 of a lock, which may be of any suitable type, but is preferably of the pin and tumbler type.

Mounted in the cylinder 21 is a rotatable cylinder 22, on the lower end of which is a gear 23.

Mounted on the upper part of the hub and resting upon a shoulder 24, formed at the upper end of the sleeve 15, is a cover member 25, which is held in position by the overhanging edge of the cap 17.

The inner wall of the flange 13, near the upper end thereof, is provided with an annular shoulder 26, shown in Fig. 2.

Rotatably mounted just inside the flange 13 is a cylindrical shell 27, having at its upper end a flange 28 designed to rest upon the shoulder 26. The shell 27 is provided at its lower edge for a portion of its periphery with teeth 29, designed to mesh with the teeth of the gear 23. The shell 27 is provided with a pair of spirally arranged slots 30, shown in Figs. 2 and 4. The opposite side of the flange 13 is provided on its inner surface with vertical grooves 31, shown in Fig. 5.

Slidably mounted in the grooves 31 are upright bars or arms 32. Screwed into the arms 32 are screws 33, the shanks of which extend through the slots 30. The screws 33 are provided with heads on their inner ends as illustrated in Fig. 4.

Secured to the lower ends of the arms 32 is an annular member 34 having a plurality of downwardly extending teeth 35, with beveled lower ends 36 which are adapted to coact with the teeth 18.

In the practical operation of my improved steering wheel lock, when the annular member 34 is at the lower limit of its movement, the steering wheel is firmly locked to the post 10 by means of the spline 16, the sleeve 15, the coacting teeth 18 and 35, the arms 32 and the flange 13.

When it is desired to unlock or loosen the wheel, so that it will turn freely on the steering post, the key is inserted into the key hole 37 in the rotatable cylinder 22, the rotatable cylinder 22 is rotated thereby imparting rotation to the gear 23, and through the teeth 29 imparting rotation to the shell 27.

The shell 27 is held against downward movement by the engagement of the flange 28 with the shoulder 26, and is held against upward movement by means of the locking devices 38, extended into the hub and overhanging the shell 27.

The rotation of the shell 27 causes the screws 33 to travel in the slots 30, and thereby forcing upwardly the arms 32 and the annular member 34 thereon, and the teeth 35 on the said annular member, until the teeth 35 clear the teeth 18, whereupon the wheel will be disconnected from the post. It will be seen that during the opposite movement of the teeth 35, they will readily move to position between the successive teeth 18, on account of the beveled lower edges of the teeth 35 and the beveled upper edges of the teeth 18.

My improved lock is of very simple and inexpensive construction, and thoroughly locks the wheel to the post when the machine is not used.

Some changes may be made in the construction, and arrangement of the parts of my improved automobile lock, without departing from the essential features and purposes, and it is my intention to cover by this application any modified forms of structure or use of mechanical equivalents, which may be reasonably included within the scope of my claims.

I claim as my invention:

1. In a device of the class described, the combination of a steering post with a wheel having a hub provided with a downwardly extending flange spaced from said post, and forming a casing, a sleeve mounted on said casing, a cover on said casing, a cap on said post overhanging said cover, said sleeve having at its lower end a plurality of spaced, laterally projecting teeth received within said casing, the upper parts of said teeth being beveled, a shell rotatably mounted within said casing having teeth at its lower portion, and provided with a spiral slot, a vertically slidable bar mounted in said casing on the interior thereof, said casing being provided with a groove to receive said bar, a member on said bar extending into said slot, a member carried by said bar at the lower end thereof, having a plurality of teeth adapted in one position of the sliding movement of said member to mesh with said first teeth, a locking device mounted in said slot having a rotary member, and a gear on said rotary member adapted to mesh with the teeth on said shell.

2. In a device of the class described, the combination of a post with a steering wheel having a hub provided with a casing member spaced from said post, a member fixed on said post having laterally extending teeth, a member slidably but non-rotatably mounted having teeth adapted in one position to mesh with said first teeth, a shell rotatably mounted within said casing and operatively connected with said last described member for raising and lowering said last described member when said shell is rotated, a locking device having a rotary member, and coacting devices, whereupon the rotation of said rotary member imparts rotation to said shell.

3. In a device of the class described, the combination of a post with a steering wheel having a casing thereon, a member fixed on said post having laterally extending teeth, a shell rotatably mounted in said casing, means adapted to be moved upwardly or downwardly when said shell is rotated, said means carrying teeth adapted in one position to mesh with said first teeth, a locking device having a rotary member, said shell being provided with teeth, said rotary member having a pinion adapted to mesh with said last described teeth.

Des Moines, Iowa, March 23, 1917.

CLAUDE E. MENTZER.